US012277443B2

(12) United States Patent
Guo et al.

(10) Patent No.: US 12,277,443 B2
(45) Date of Patent: Apr. 15, 2025

(54) DEBUGGING BY PREDICT ACCESSING INFORMATION

(71) Applicant: INTERNATIONAL BUSINESS MACHINES CORPORATION, Armonk, NY (US)

(72) Inventors: Jiu Fu Guo, Shanghai (CN); Ke Wen Lin, Shanghai (CN); Zheng Chen, Shanghai (CN); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 17/807,147

(22) Filed: Jun. 16, 2022

(65) Prior Publication Data

US 2023/0409385 A1    Dec. 21, 2023

(51) Int. Cl.
*G06F 9/44*    (2018.01)
*G06F 9/48*    (2006.01)

(52) U.S. Cl.
CPC .................... *G06F 9/4881* (2013.01)

(58) Field of Classification Search
CPC .................................................. G06F 9/4881
USPC ......................................................... 718/103
See application file for complete search history.

(56) References Cited

U.S. PATENT DOCUMENTS

2018/0196736 A1* 7/2018 Lincoln ............... G06F 11/3636
2020/0401499 A1   12/2020 Peck

FOREIGN PATENT DOCUMENTS

| CN | 110727577 A | 1/2020 |
| CN | 110737557 A | 1/2020 |
| CN | 108910642 B | 3/2021 |

OTHER PUBLICATIONS

Mell et al., "The NIST Definition of Cloud Computing", National Institute of Standards and Technology, Special Publication 800-145, Sep. 2011, 7 pages.

* cited by examiner

*Primary Examiner* — Timothy A Mudrick
(74) *Attorney, Agent, or Firm* — Lily Neff

(57) ABSTRACT

A method, computer system, and a computer program product for improving debugging speed by rearranging debugging priority functions. In one embodiment, runtime input may be received about a program to be debugged. Feedback information is obtained about at least one similar program previously debugged. The compiling time information and runtime information are analyzed to determine a status of functions including one or more focused functions that will be used frequently and one or more unreachable functions that may never will be executed. A priority list of debugging functions is generated based on the feedback information, the runtime input and a function status. A plurality of debugging information are rearranged and parsed on the priority list prior to said program being debugged based on said debugging information.

20 Claims, 6 Drawing Sheets

DEBUGGING BY PREDICT ACCESSING INFORMATION

BACKGROUND

The present invention relates generally to the field of computing and more particularly to techniques for debugging by predicting accessing information.

A debugger can be a computer tool used to test and debug target programs. The main purpose of using a debugger may be to run a particular program under controlled conditions that permit the programmer to track its operations in progress and monitor changes. The changes that usually being tracked may be in different parts of the network (such as in resources like memory areas) used by the target program or the computer's operating system. The debugging discovers malfunctioning code. Typical debugging facilities include the ability to run or halt the target program at specific points, display the contents of memory, CPU registers or storage devices and modify memory or register contents in order to enter selected test data that night be a cause of faulty program execution.

One challenge in using a debugging tool may be that many debuggers run very slow when debugging a big program with large debug information at startup and debugging process. The latter may be due to the time-consuming debug information loading, parsing, and querying. Consequently, improvements need to be made to these systems so that the waiting time during start-up time and completion of debugging programs can be minimized.

SUMMARY

Embodiments of the present invention disclose a method, computer system, and a computer program product for improving debugging speed by rearranging debugging priority functions. In one embodiment, runtime input may be received about a program to be debugged. Feedback information is obtained about at least one similar program previously debugged. The compiling time information and runtime information are analyzed to determine a status of functions including one or more focused functions that will be used frequently and one or more unreachable functions that may never will be executed. A priority list of debugging functions is generated based on the feedback information, the runtime input and a function status. A plurality of debugging information are rearranged and parsed on the priority list prior to said program being debugged based on said debugging information.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
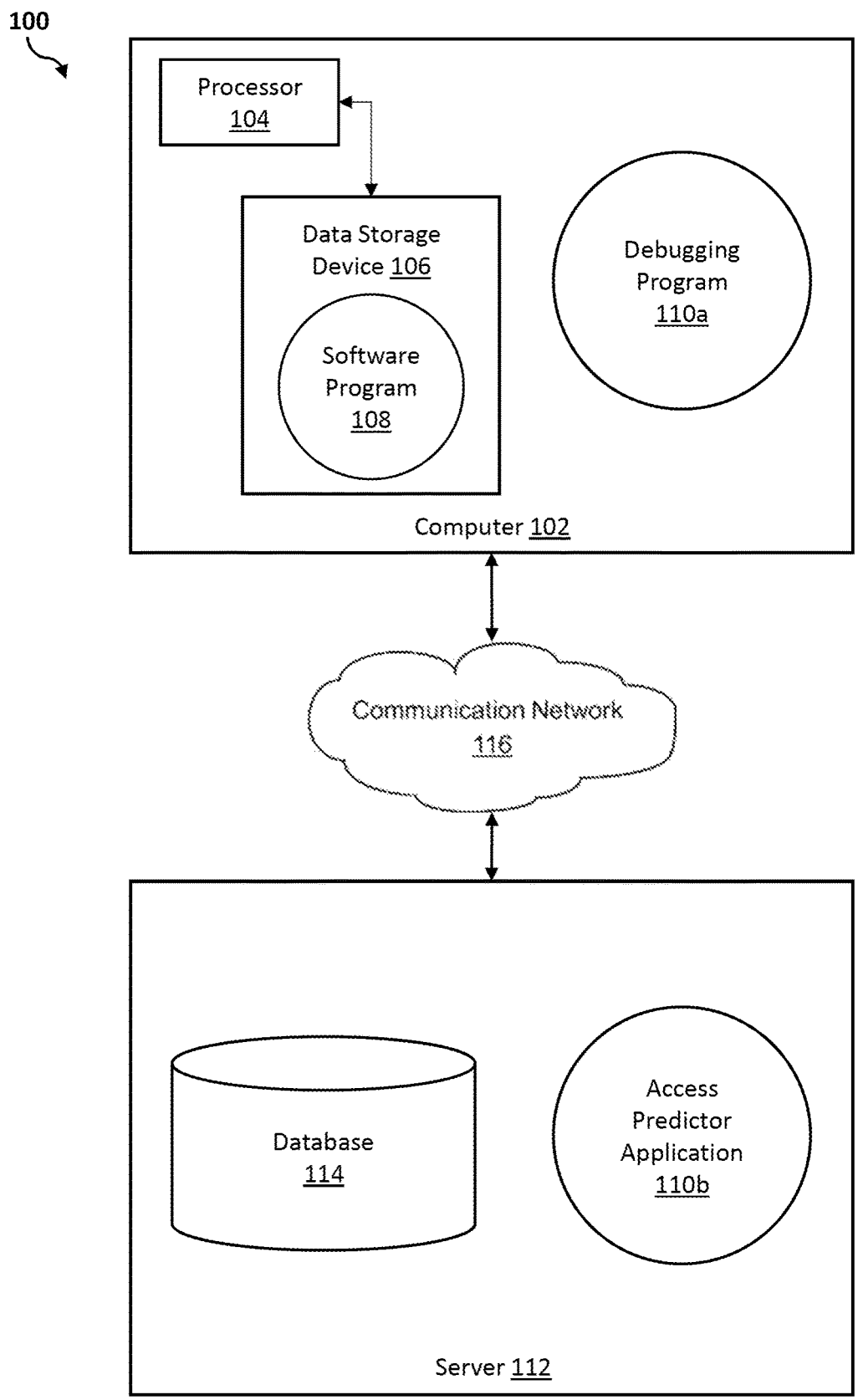
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but may not be limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and computer program product for improving debugging speed by rearranging debugging priority functions. In one embodiment, runtime input may be received about a program to be debugged. Feedback information may be also obtained about similar programs previously debugged. The feedback information and runtime input may then be analyzed to identify functions that can be debugged together. In addition, compiling time information may be analyzed to determine status of functions including focused functions that will be used frequently and special functions that may impact debugging special functions that may impact debugging. A priority list may be then generated of debugging functions based on feedback information, runtime input and function status. Debugging information may be then rearranged based on the priority list prior to the program being debugged based on the debugging information.

FIG. 1 provides an exemplary networked computer environment 100 in accordance with one embodiment. The networked computer environment 100 may include a computer 102 with a processor 104 and a data storage device 106, enabled to run a software program 108 and a debugger program 110a. The networked computer environment 100 may also include a server 112, enabled to run an access predictor application 110b that may interact with a database 114 and a communication network 116. The networked computer environment 100 may include a plurality of computers 102 and servers 112, only one of which has been shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as an exclusive cloud, community cloud, public cloud, or hybrid cloud. Client computer 102 may be, for example, a mobile device, a telephone, a customized digital assistant, a netbook, a laptop computer, a tablet computer, a desktop computer, or any type of computing devices capable of running a program, accessing a network, and accessing a database 114. According to various implementations of the present embodiment, debugging program 110a, and an access predictor application 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the program/application 110a, 110b (respectively) to provide a user review submission and feature extraction technique. This technique will be provided in more detail below with respect to FIGS. 2 through 4.

Figure 2:
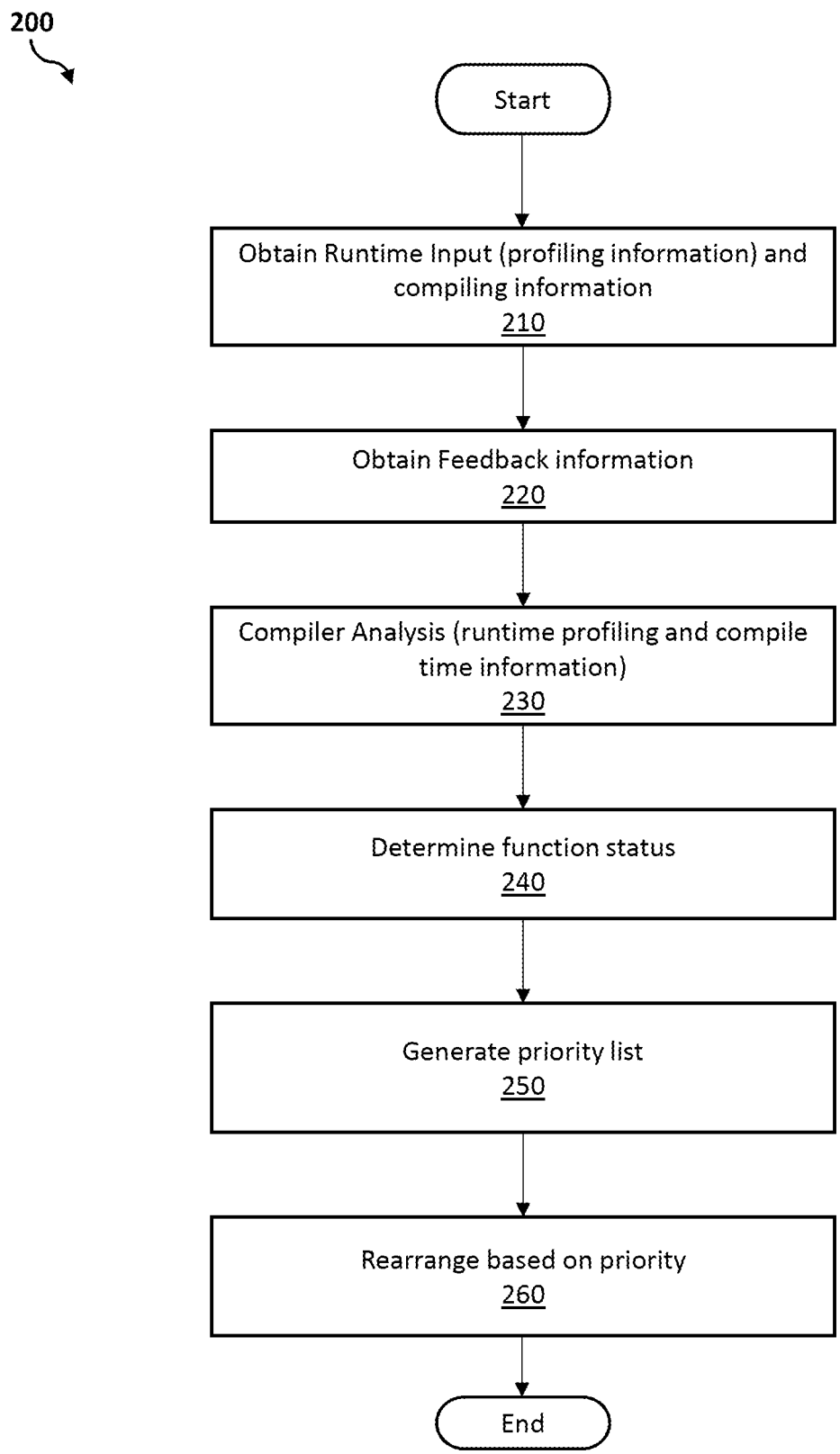
FIG. 2 provides an operational flowchart illustrating debugging predictor according to one embodiment.

Referring now to FIG. 2, a flowchart depiction for techniques to speed up debugging process with predictive information. This can be helpful in improving the speed and accelerating application debugging process by utilizing this predictive information of debug loading and handling.

In Step 210, runtime input about the program to be debugged may be obtained. This can include obtaining one or more functions that may be used or will never be used at the start of the debugging function with specific input from the previous runs. In one embodiment, this can lead to also generating information about most used functions (with profiling info) which may be most likely to be used in the current debugging exercise. This may be done to predict and get those most likely used debug information, the application's compiling time information and runtime information may be collected, and the debugging process may be also analyzed. The analysis may be a culmination of steps 220-250 as will be discussed below. Compiling time information includes program's call graph, entry function, leaf functions and the like. Runtime information includes functions that are hot during the run and functions that are never executed with specific input, variable ranges, branch hits etc.

In Step 220, feedback information may be also obtained. This may be to obtain similar programs that were previously debugged (current program and/or debug functions may be successors to these). Analyzing this type of previous debugging feedback to know functions that are more frequently used or will be used, to only load debug information for functions in call stacks related to these functions. This may include debugging some functions that may be the successors of the current function. The latter will lead to obtaining application feedback, logging debugging history. A collaboration relationship will then be established to make it easier to debugged certain function together.

In Step 230, the feedback information and said runtime input may be analyzed to identify functions that can be debugged together. In one embodiment, analyzing Compiler and Feedback together ensures a more accurate priority is given to the debug symbols that users care, so process can load/parse as less debug information as possible in debugger. In one embodiment, this leads to a runtime profiling information to be established based on this gathered and analyzed information so as to provide collaboration grouping. This will subsequently allow for the setting up of a priority list for debugging order.

In Step 240, compiling time information may be analyzed to determine focused functions that will be used frequently and special functions that may impact debugging. The focused functions can be hot functions and special functions may impact debugging may be determined. This may include the analysis of the symbols and function like the unreachable function with the runtime input may be provided. More specifically, in certain information may be debugged by parsing and loading to determine these functions. One example may be that of a "main" entry symbol. These may be unreachable functions that need to be filtered due to un-return entries. At startup, only a few special symbols and related debug information may be parsed and loaded, the 'main' entry symbol. And some special symbols may be filtered to load and parse, e.g., unreachable symbols.

In one embodiment, at the time when the user interacts with the debugger, the information will be parsed and loaded. For example, when the user specifies to stop at routine 'foo', then 'foo' related information will be analyzed and loaded. Another example: the exception/dumping routines may be loaded especially for the routines which may be checked by the user, like 'stop'/'print'. In this example, at the point, when the user debugging the application, the call stack would be analyzed: it's very likely to go to debug some functions that may be the successors of the current function. This will address many of the prior art shortcomings such as the need to split the large waiting time during start-up to much small waiting time for each debugged function to overcome the time-consuming process.

Figure 3:
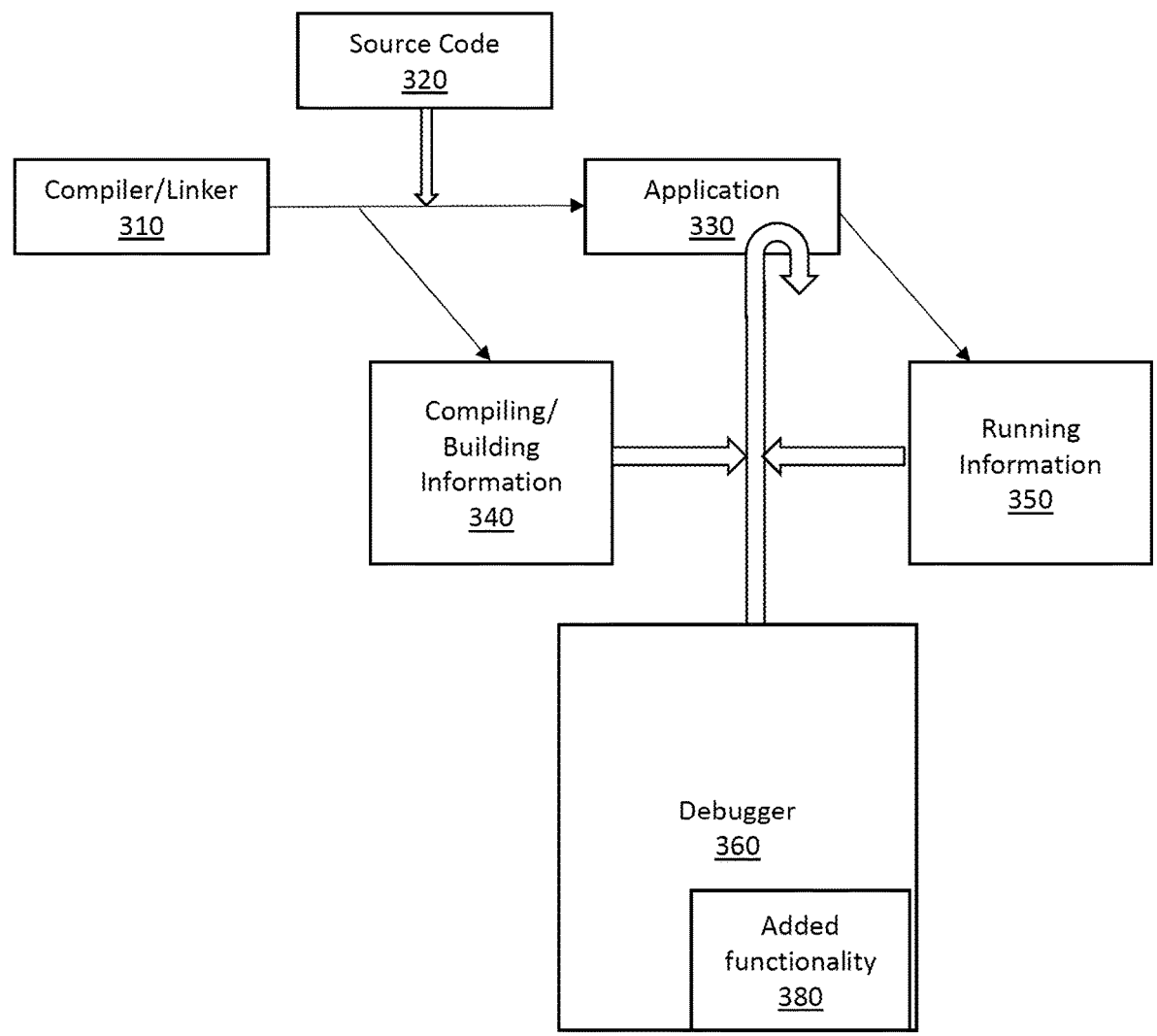
FIG. 3 provides a block diagram showing implementation components according to embodiment of FIG. 2.

Step 250 provides for a priority list of debugging functions based on feedback information, runtime input and special function status and Step 260 provides for the rearranging of debugging information based on this priority list prior to said program being debugged based on said debugging information. In one embodiment these two steps may also include the compiling of the program. In this step, at compile time, besides the special symbols processing as discussed above, both Link Time Optimization (LTO), that provides whole application information; and profile guided optimization (PGO) which provides specific information may be also collected. LTO provides an intraprocedural optimization to improve performance in a program that contains mainly functions of small or medium length. PGO allows for optimization of a whole executable file, where the optimizer uses data from test runs and data represents the likely performance of the program such as in a production environment. This allows for prediction. For example, hot functions would be predicted as the user focusing point, especially for the high-performance-computation application. Another example: the user may check the exception/dumping routines that could be analyzed. These together will lead back to the prioritization and rearranging of the layout of the debug information for the functions in final form which can speedup debugging information by loading it in a debugger. FIG. 3 will provide a block diagram of these functions that make understanding this easier.

FIG. 3 provides for a block diagram that further illustrates some of the functionality discussed in FIGS. 1 and 2. An application such as the one in 110b that will provide access predictions will receive information from the compiler 310 and the source code provider 320. This information is also provided to the application after some compiling and building as shown at 340. For example the compiling at 340 can provide entry points, hot functions, call graphs and any changed functions to the application 330. The box provided as 350 (Running information) provides the runtime input and may be where the stack calls originate. Other information running information 350) that can be provided may be the debug history, function bounds and branch information. The debugger 360 can also provide information such as any additional specific information and functionality 380. The arrows indicate a recycling of information between application 330 and components 340, 350 and 360. This allows for information to be easily dissipated and creates many advantages during the debugging session. For example, the needed information can be parsed and loaded at the time when the user interacts with the debugger 360.

In another example, when the user specifies to stop at routine 'foo', then 'foo' related information will be analyzed and loaded. Another example: the exception/dumping routines may be loaded especially for the routines which may be checked by the user, like 'stop'/'print'. In this scenario, at the point when the user debugs the application, the call stack would be analyzed: it's very likely to go to debug some functions that may be the successors of the current function.

In this way, the application 330 (such as 110b) then also the output of debugger 360 and other running information 350 (and any added functionality 380) for final processing. As illustrated by the arrows, the debugging process can be analyzed as feedback information. For example, in a previous debugging if symbol 'foo' has been checked, then in the next debugging process, 'foo' related information can be predicted as possible prioritized symbols to debug. In addition, the runtime information may be also anal zed such as by the debugger 360. For example, for the variables with max/min boundary values, and the condition variable which related to 'checked' function, we could predict as priority debug information to be parsed.

Figure 4:
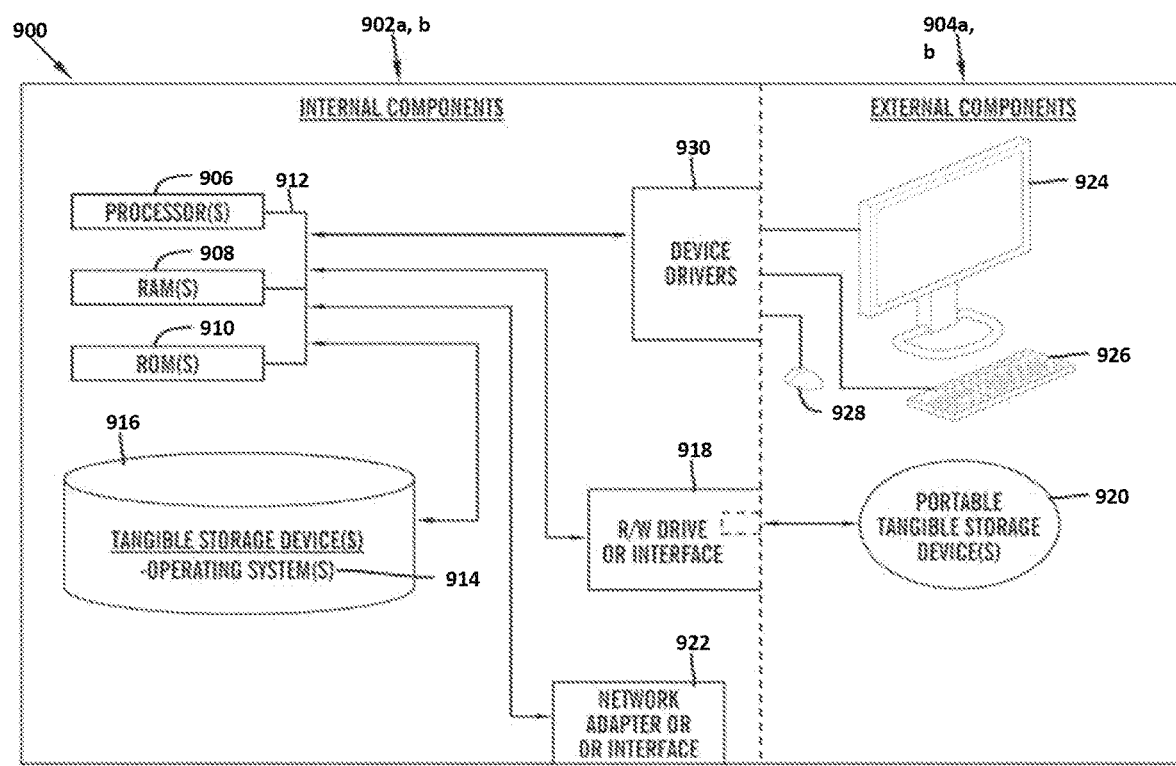
FIG. 4 provides a block diagram of internal and external components of computers and servers depicted in FIG. 1 according to at least one embodiment.

FIG. 4 provides a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 may be representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but may not be limited to, individual computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the debugging program 110a in client computer 102, and the access predictor application 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 may be a magnetic disk storage device of an internal hard drive. Alternatively, each of the computer-readable tangible storage devices 916 may be a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the debugging program 110a and the access predictor application 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the debugging program 110a in client computer 102 and the access predictor application 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the debugger program 110a in client computer 102 and the access predictor application 110b in network server computer 112 may be loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It should be understood in advance that although this disclosure includes a detailed description on cloud computing, implementation of the teachings recited herein may not be limited to a cloud computing environment. Rather, embodiments of the present invention may be capable of being implemented in conjunction with any other type of computing environment now known or later developed.

Cloud computing provides a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may be as follows:

On-demand self-service: a cloud consumer can unilaterally provision computing capabilities, such as server time and network storage, as needed automatically without requiring human interaction with the service's provider.

Broad network access: capabilities may be available over a network and accessed through standard mechanisms that promote use by heterogeneous thin or thick client platforms (e.g., mobile phones, laptops, and PDAs).

Resource pooling: the provider's computing resources may be pooled to serve multiple consumers using a multi-tenant model, with different physical and virtual resources dynamically assigned and reassigned according to demand. There may be a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may be as follows:

Software as a Service (SaaS): the capability provided to the consumer may be able to use the provider's applications running on a cloud infrastructure. The applications may be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer may be deployed onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer may be to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may be as follows:

Customized and Individual cloud: the cloud infrastructure may be operated solely for an organization. It may be managed by the organization or a third party and may exist on-premises or off-premises.

Community cloud: the cloud infrastructure may be shared by several organizations and supports a specific community that has shared concerns (e.g., mission, security requirements, policy, and compliance considerations). It may be managed by the organizations or a third party and may exist on-premises or off-premises.

Public cloud: the cloud infrastructure may be made available to the general public or a large industry group and may be owned by an organization selling cloud services.

Hybrid cloud: the cloud infrastructure may be a composition of two or more clouds (customized and individual, community, or public) that remain unique entities but may be bound together by standardized or proprietary technology that enables data and application portability (e.g., cloud bursting for load-balancing between clouds).

A cloud computing environment may be a service oriented with a focus on statelessness, low coupling, modularity, and semantic interoperability. At the heart of cloud computing may be an infrastructure comprising a network of interconnected nodes.

Figure 5:
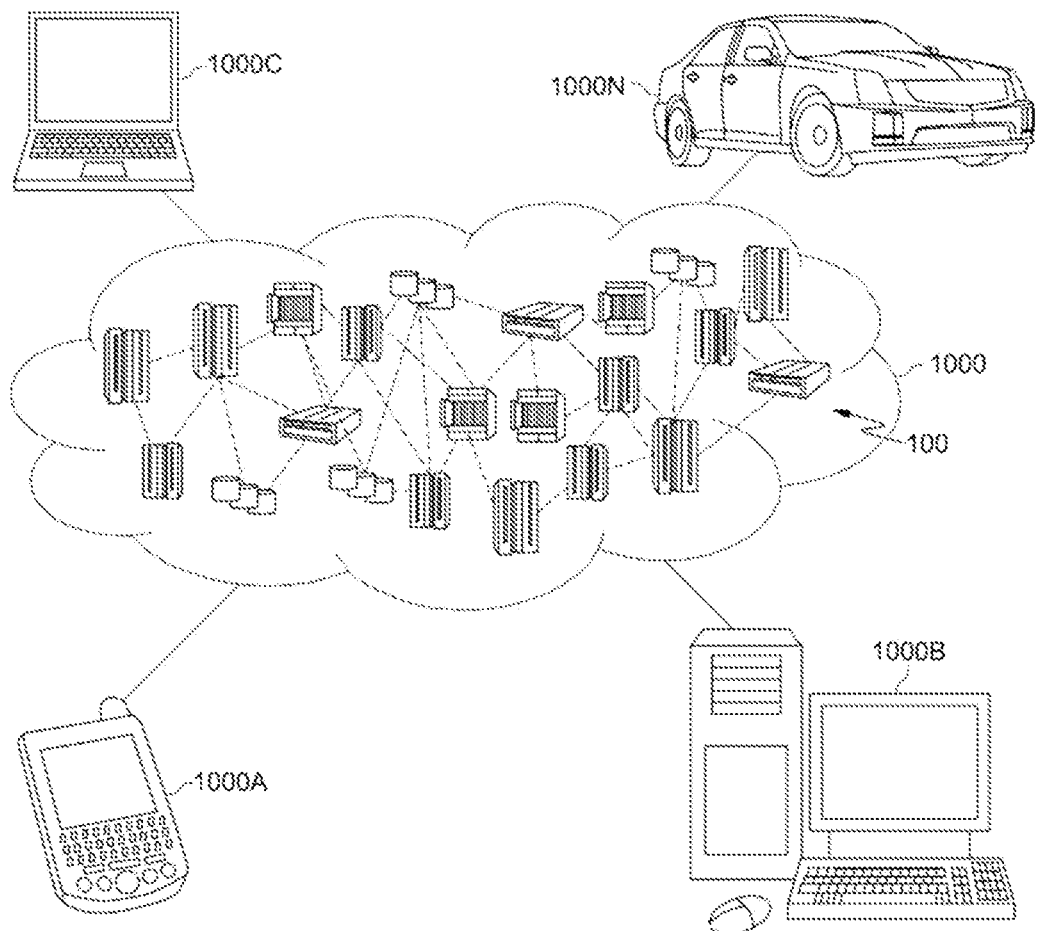
FIG. 5 provides a block diagram of an illustrative cloud computing environment including the computer system depicted in FIG. 1, in accordance with one embodiment.

Referring now to FIG. 5, illustrative cloud computing environment 1000 may be depicted. As shown, cloud computing environment 1000 comprises one or more cloud computing nodes 100 with which local computing devices used by cloud consumers, such as, for example, digital assistants (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as exclusive, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It may be understood that the types of computing devices 1000A-N shown in FIG. 4 may be intended to be illustrative only and that computing nodes 100 and cloud computing environment 1000 can communicate with any type of computerized device over any type of network and/or network addressable connection (e.g., using a web browser).

Figure 6:
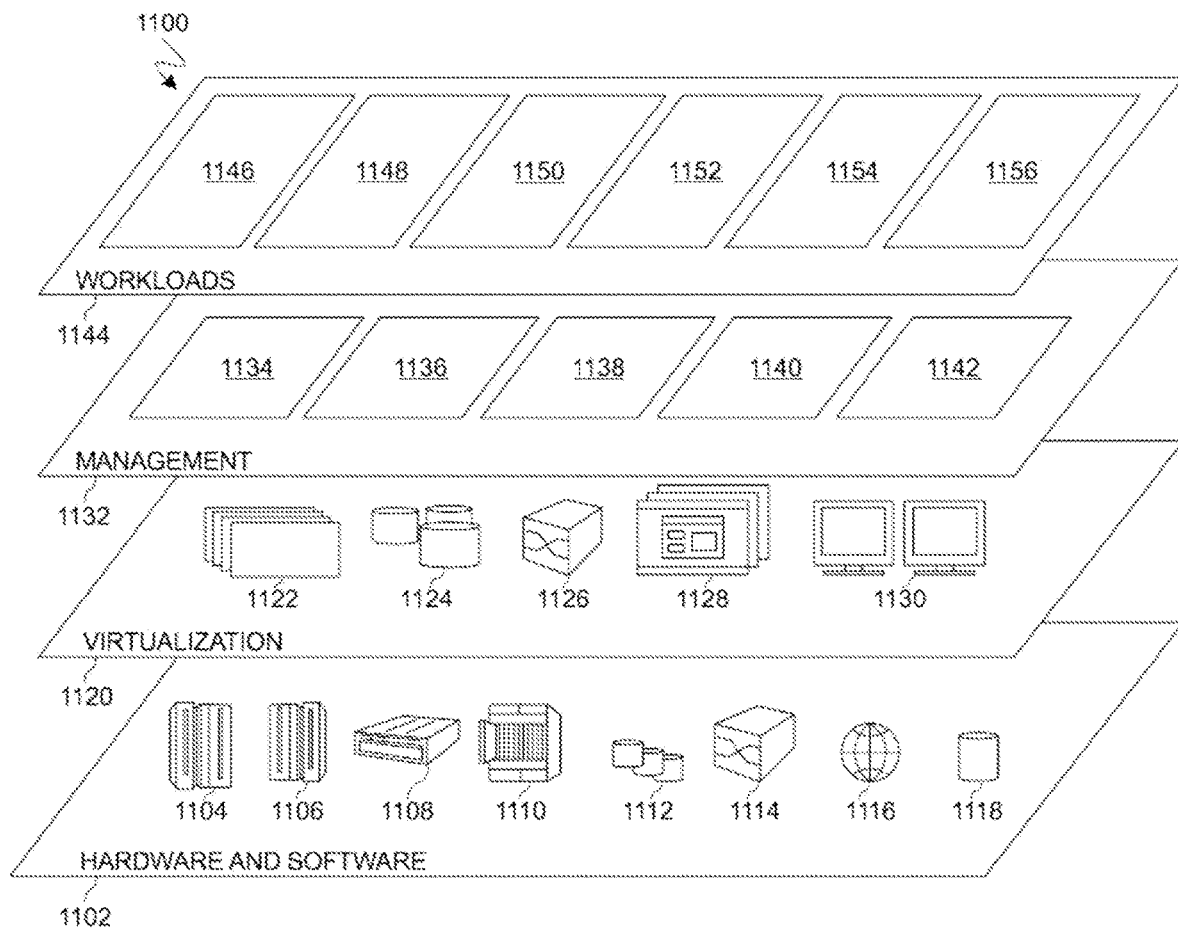
FIG. 6 provides a block diagram of functional layers of the illustrative cloud computing environment of FIG. 5, in accordance with an embodiment.

Referring now to FIG. 6, a set of functional abstraction layers 1100 provided by cloud computing environment 1000 has been shown. It should be understood in advance that the components, layers, and functions shown in FIG. 5 may be intended to be illustrative only and embodiments of the invention may be not limited thereto. As depicted, the following layers and corresponding functions may be provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual exclusive networks; virtual applications and operating systems 1128; and virtual clients 1130.

In one example, management layer 1132 may provide the functions described below. Resource provisioning 1134 provides dynamic procurement of computing resources and other resources that may be utilized to perform tasks within the cloud computing environment. Metering and Pricing 1136 provide cost tracking as resources may be utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels may be met. Service Level Agreement (SLA) planning and fulfillment 1142 provide pre-arrangement for, and procurement of, cloud computing resources for which a future requirement may be anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data management 1156.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving debugging speed by rearranging debugging priority functions, comprising:
    receiving runtime input about a program to be debugged;
    obtaining information about similar programs previously debugged;
    analyzing compiling time information and runtime information to provide a feedback that determine a status of functions including one or more focused functions that will be used frequently that impacts debugging and one or more unreachable functions that may never will be executed;
    analyzing said feedback to identify functions that can be debugged together and provide a runtime profiling information to establish collaboration grouping of functions that can be debugged together;
    determining compile time information based on said collaboration grouping and one or more specific of each function including unreachable functions and one or more components that impacts debugging;
    generating a priority list of debugging functions based on said feedback, runtime input and function status; and
    rearranging debugging information based on said priority list prior to said program being debugged based on said debugging information and based on determined compile time information.

2. The method of claim 1, wherein obtaining runtime input further comprises calling a stack to get previous information about a plurality of functions; said functions being successors to at least a current function being debugged.

3. The method of claim 1, wherein obtaining feedback information further comprises obtaining logging debugging history and information about functions collaboration relationship.

4. The method of claim 3, wherein said function collaboration relationship can be used to determine with functions can be debugged together.

5. The method of claim 3, wherein said functions that are used more often based on prior collaboration relationship is prioritized.

6. The method of claim 3, wherein said functions that are unlikely to be used based on prior collaboration relationship are prioritized last or removed from said priority list.

7. The method of claim 1, wherein a user can provide information about said debugging that will be parsed and loaded to provide said priority list.

8. The method of claim 1, wherein said special functions include at least one unreachable function with runtime input.

9. The method of claim 8, wherein said at least one unreachable function is analyzed at compiling time based on their symbols and function type.

10. The method of claim 1, wherein said priority list is based on predicting debugging information determined by analysis of runtime input, feedback information and said determination of special functions.

11. A computer system for providing an automatic review summary of user submissions, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of a debugging method comprising:
    receiving runtime input about a program to be debugged;
    obtaining feedback about similar programs previously debugged;
    analyzing compiling time information and runtime information to provide a feedback that determine a status of functions including one or more focused functions that will be used frequently that impacts debugging and one or more unreachable functions that may never will be executed;
    analyzing said feedback to identify functions that can be debugged together and provide a runtime profiling information to establish collaboration grouping of functions that can be debugged together;
    determining compile time information based on said collaboration grouping and one or more specific of each function including unreachable functions and one or more components that impacts debugging;
    generating a priority list of debugging functions based on said feedback, runtime input and function status; and
    rearranging debugging information based on said priority list prior to said program being debugged based on said debugging information and based on determined compile time information.

12. The computer system of claim 11, wherein obtaining runtime input further comprises calling a stack to get previous information about a plurality of functions; said functions being successors to at least a current function being debugged.

13. The computer system of claim 11, wherein obtaining feedback information further comprises obtaining logging debugging history and information about functions collaboration relationship.

14. The computer system of claim 13, wherein said function collaboration relationship can be used to determine with functions can be debugged together.

15. The computer system of claim 11, wherein a user can provide information about said debugging that will be parsed and loaded to provide said priority list.

16. The computer system of claim 11, wherein said special functions include at least one unreachable function with runtime input.

17. A computer program product for providing an automatic review summary of user submissions, comprising:
one or more computer-readable storage medium and program instructions stored on at least one of the one or more tangible storage medium, the program instructions executable by a processor, the program instructions comprising:
receiving runtime input about a program to be debugged;
obtaining feedback about similar programs previously debugged;
analyzing compiling time information and runtime information to provide a feedback that determine a status of functions including one or more focused functions that will be used frequently that impacts debugging and one or more unreachable functions that may never will be executed;
analyzing said feedback to identify functions that can be debugged together and provide a runtime profiling information to establish collaboration grouping of functions that can be debugged together;
determining compile time information based on said collaboration grouping and one or more specific of each function including unreachable functions and one or more components that impacts debugging;
generating a priority list of debugging functions based on said feedback, runtime input and function status; and
rearranging debugging information based on said priority list prior to said program being debugged based on said debugging information and based on determined compile time information.

18. The computer program product of claim 17, wherein obtaining runtime input further comprises calling a stack to get previous information about a plurality of functions; said functions being successors to at least a current function being debugged.

19. The computer program product of claim 17, wherein obtaining feedback information further comprises obtaining logging debugging history and information about functions collaboration relationship.

20. The computer program product of claim 19, wherein said function collaboration relationship can be used to determine with functions can be debugged together.

\* \* \* \* \*